Figure 3:
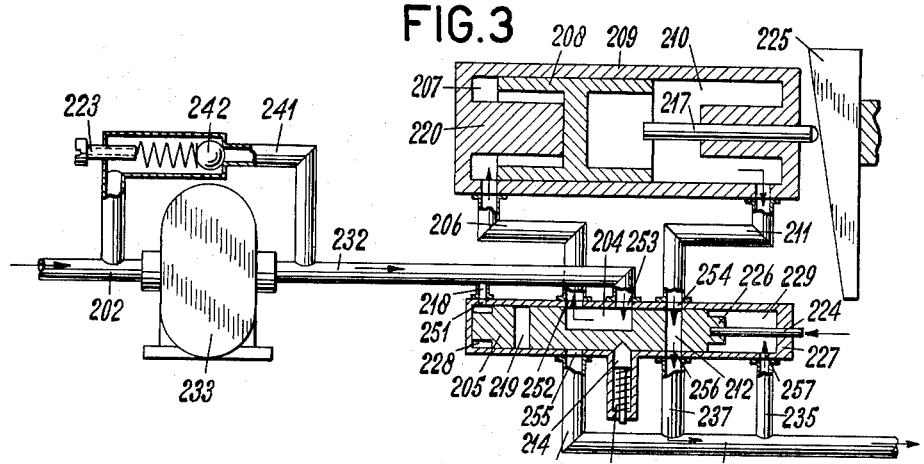

Aug. 17, 1965  L. P. KOPPENS  3,200,990
APPARATUS FOR OBTAINING AN APPORTIONED
AMOUNT OF LIQUID MIXTURE
Filed Dec. 5, 1960  12 Sheets-Sheet 1
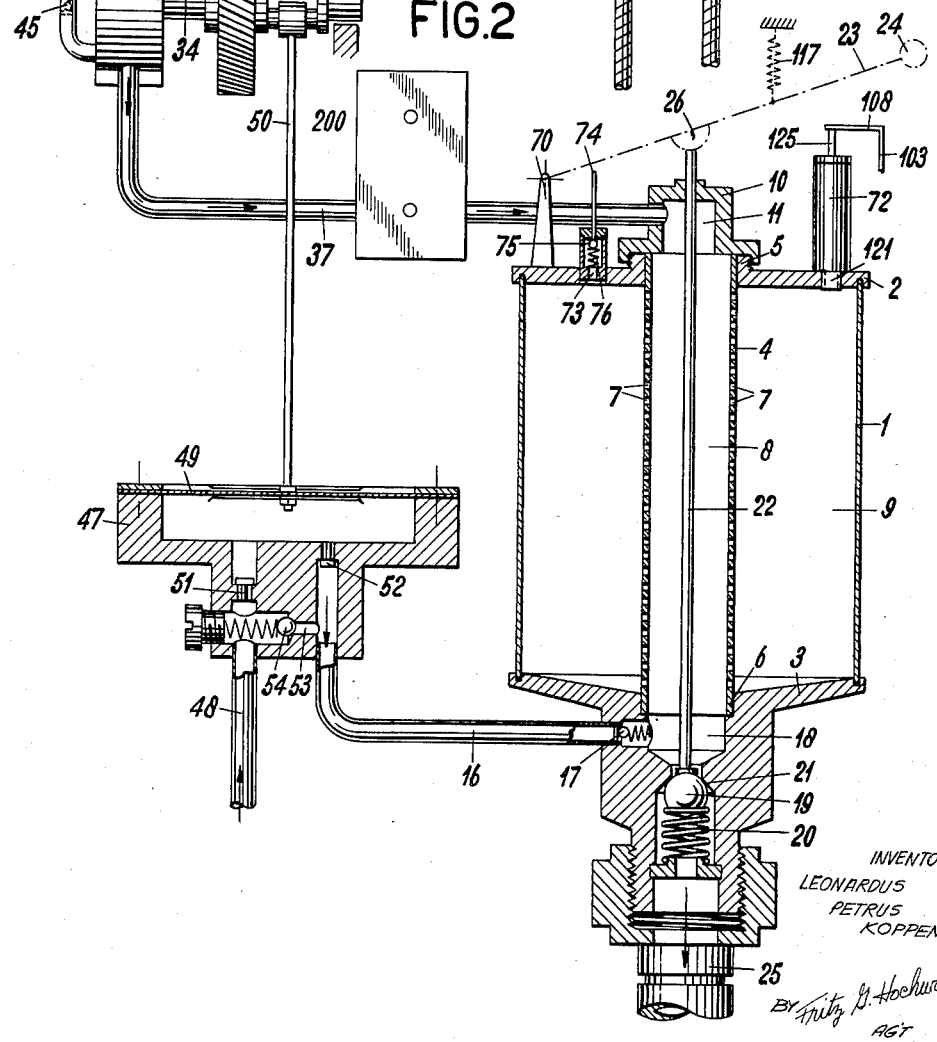
INVENTOR
LEONARDUS
PETRUS
KOPPENS
BY Fritz G. Hochwald
AGT Aug. 17, 1965

L. P. KOPPENS 3,200,990

APPARATUS FOR OBTAINING AN APPORTIONED
AMOUNT OF LIQUID MIXTURE

Filed Dec. 5, 1960

12 Sheets-Sheet 2

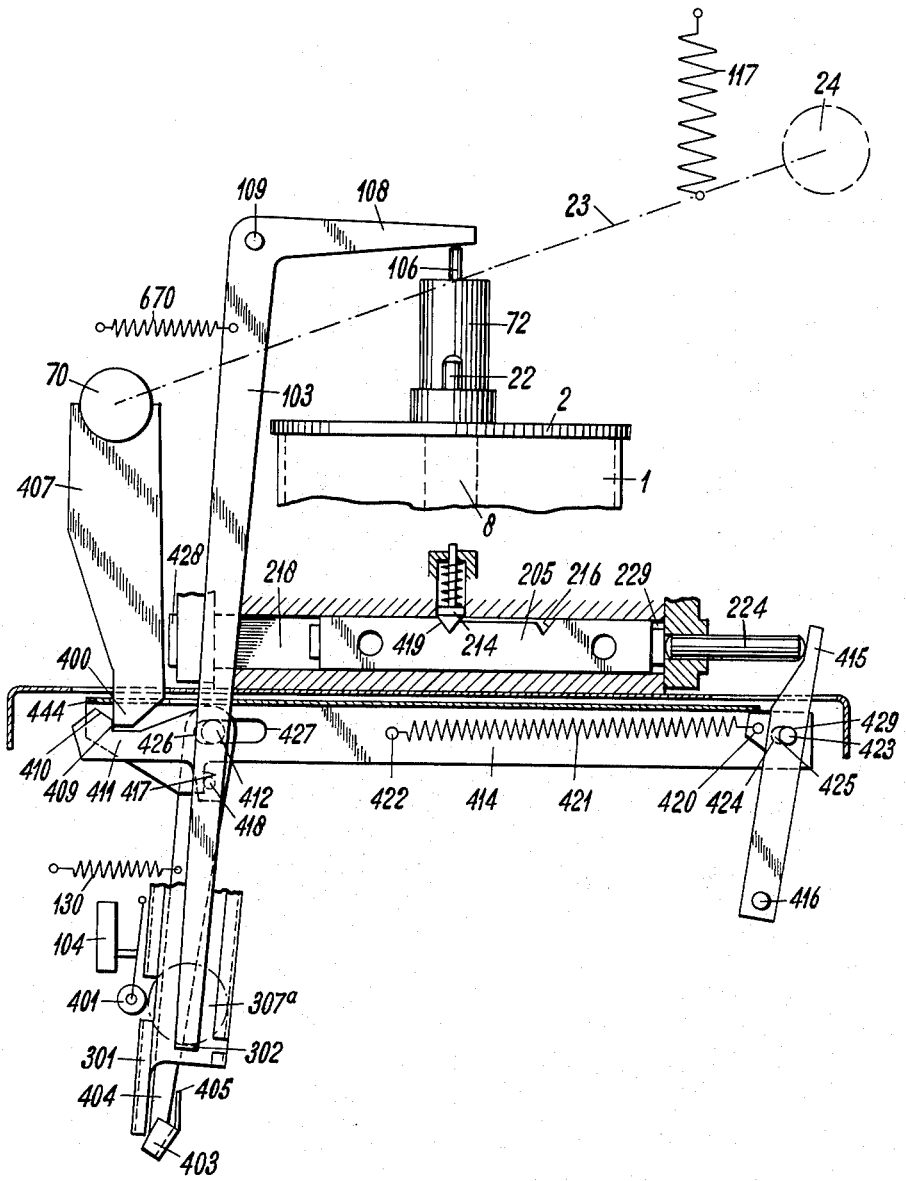

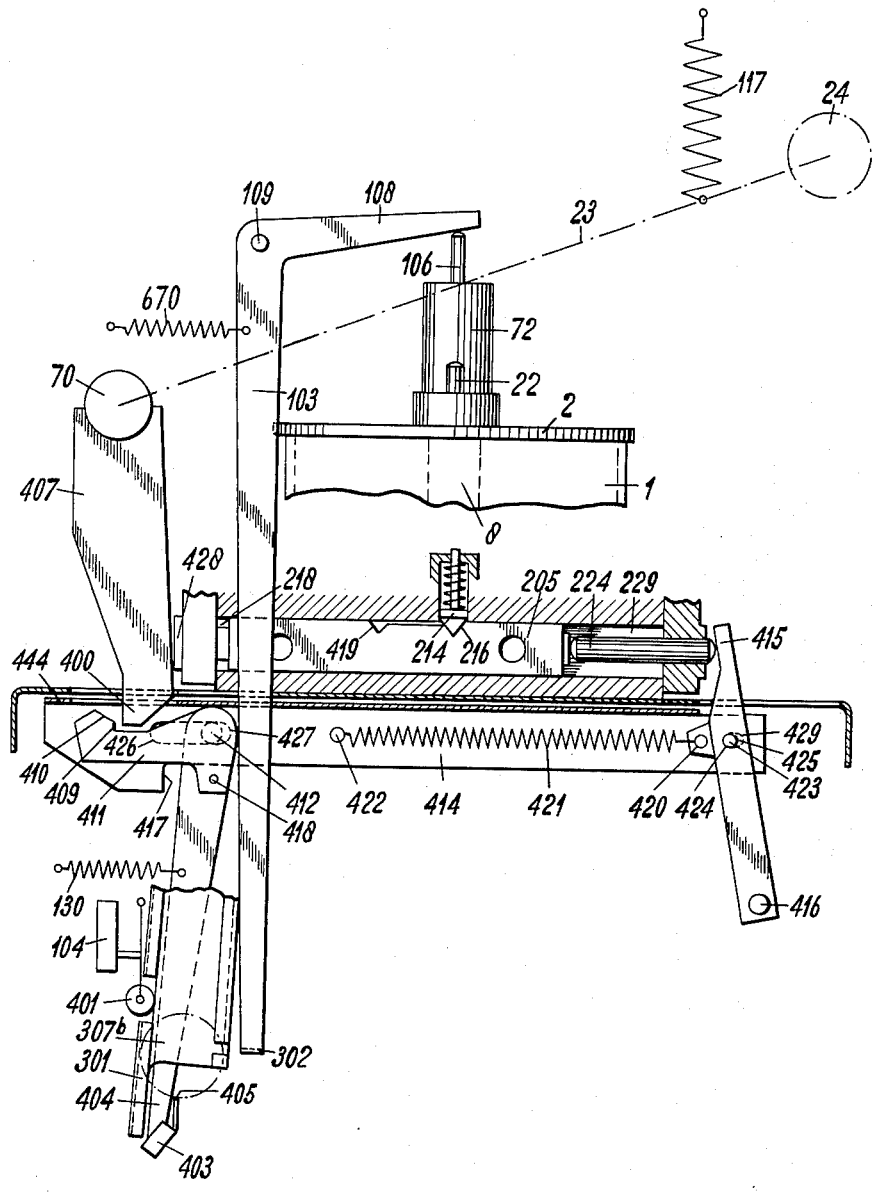

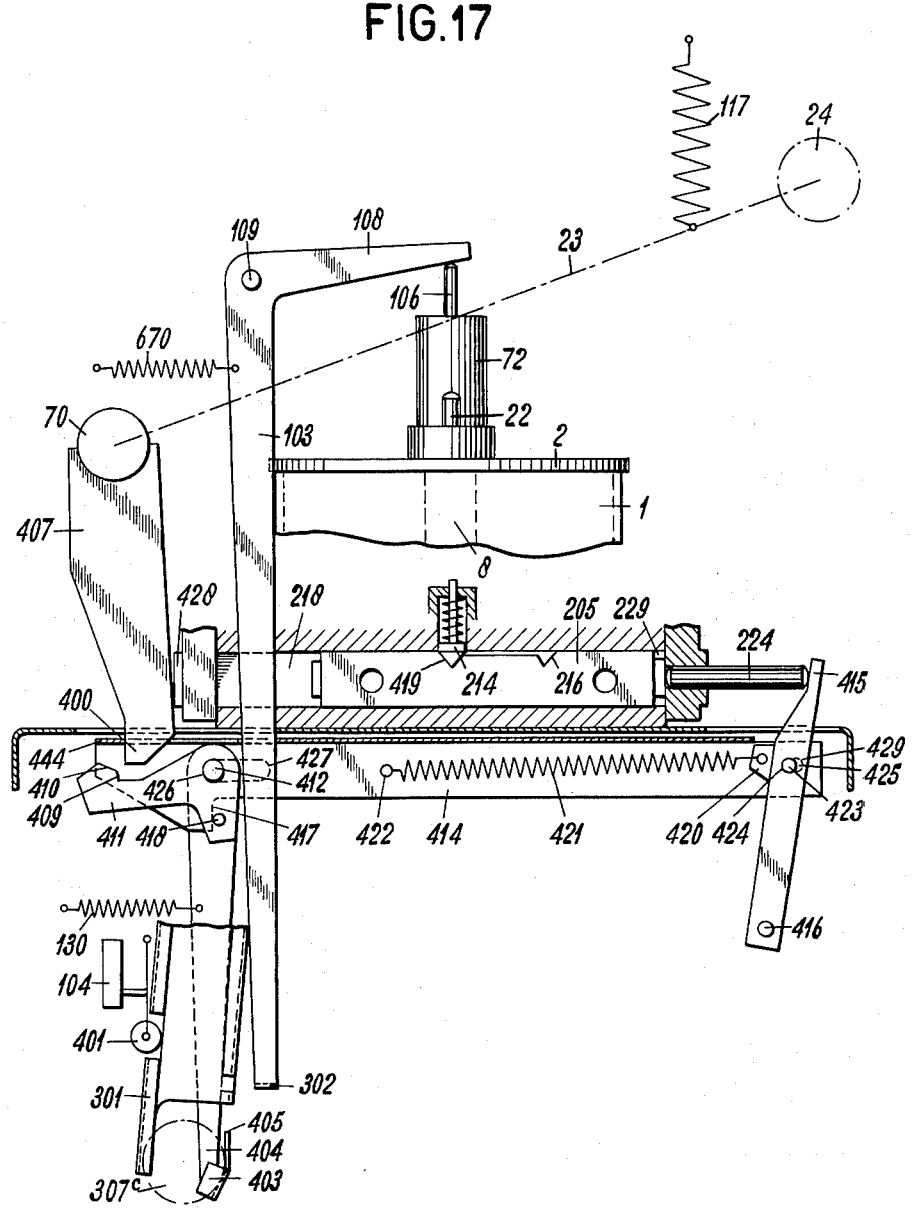

United States Patent Office 3,200,990
Patented Aug. 17, 1965

3,200,990
APPARATUS FOR OBTAINING AN APPORTIONED
AMOUNT OF LIQUID MIXTURE
Leonardus Petrus Koppens, Postel 11,
Someren, Netherlands
Filed Dec. 5, 1960, Ser. No. 73,646
13 Claims. (Cl. 222—2)

The invention relates to an apparatus for obtaining, by the operation of a self-serving device, an apportioned amount of a mixture of one or more subsidiary liquids with a main liquid in proportions selectable at will. In particular, the invention aims at providing a mixture of petrol and lubricating oil in which the mixing proportions can within certain limits be selected at will by the user of the apparatus and in which it is also possible to make a choice from two or more lubricating oils. In the first place the object of the invention is to cater for the convenience of users of motorized bicycles (autocycles) and similar small consumers, as there are numerous types of autocycles which differ from each other both as regards the desired mixing proportions and as regards the grade of lubricating oil to be used. An apparatus that can be used as a self-serving device is also of economic importance because autocyclists only buy small amounts of petrol on each occasion and therefore take up too much of the time of the operating staff of the filling station especially as these buyers have very varied requirements as regards both the grade of lubricating oil and the mixing proportions so that it is difficult to meet all their wishes from stock.

Another consideration is that with the various methods of supplying with their required petrol mixture it is neither to provide sufficient safeguards against risk of fire nor to offer any certainty that the correct amount of petrol paid for is being delivered, nor can any guarantee be given that the amount purchased has the correct mixing proportions or that it furnishes the right grade of lubricating oil.

Another important advantage of the devices according to the invention is that its use ensures perfect cleanliness of the liquids. With the known systems for mixing, say, petrol and lubricating oil for autocycles, use is generally made for bottles, open containers, funnels and suchlike, the fouling of which in the long run means that the petrol mixture no longer possesses the required degree of cleanliness and will therefore have an adverse effect on the motor.

With the apparatus according to the invention, however, all these drawbacks are eliminated, as the self-service afforded by the apparatus relieves the staff of the petrol filling station, the user being able also at night to obtain the correct petrol mixture himself with the aid of token coins which he has bought in advance; furthermore, the apparatus can easily be calibrated both as regards the amount of mixture delivered and as regards the mixing proportions; it does not involve any danger of fire, as all the petrol can be kept under the ground and only the requisite amount is pumped up; and lastly, a certain guarantee is afforded that the apparatus will only be used by those concerned. Indeed, if the token coins which will operate the apparatus are sold by the petrol filling stations to motorized road users only, the risk that petrol supplies may be taken by unauthorized persons e.g. juveniles, is greatly diminished. Moreover, the risk of petrol being spilt in the vicinity of the filling station as a result of the use of the apparatus according to the invention is also greatly reduced, whereas the existing methods of selling petrol to autocyclists do undoubtedly involve too great a risk of spilling and consequent danger of fire, as the petrol for autocyclists is always kept above ground, in breakable bottles or loose tins or casks, which is also prejudicial to cleanliness.

According to the invention the existing drawbacks are eliminated by the fact that the apparatus according to the invention possesses the characteristic that it is prepared by the user for partly automatic operation, this being achieved, for instance, either by the insertion of a coin or by operating a preparatory device, e.g. a lock or handle, after which, with the aid of one or more subsidiary liquid measuring containers, an amount selectable at will of each of these subsidiary liquids is automatically passed into a self-mixing dosage container and the main liquid is at the same time passed automatically into the dosage container until a total volume of the mixture adjustable has been obtained, the collected liquids being completely intermixed as a result of the inflow of the main liquid, whereupon each of the subsidiary liquid measuring containers is refilled with its own liquid for the benefit of the next user; then, when the dosage container is completely filled, a toggle switch or similar control comes into action as a result of which the supply of the main liquid automatically ceases; only after this point has been reached can the mixture be made to flow out of the draw-off container as a result of the operation of a draw-off control, a re-mixing of the liquid mixture being effected during this flow-out, after which all the operating controls finally revert to their original positions so that the apparatus is ready to begin a fresh operating cycle.

The apparatus according to the invention possesses the further characteristic of being provided with a self-mixing dosage container within whose volume an internal container is provided, the volume occupied by the said internal container being connected by means of apertures of small diameter with the remainding volume of the dosage container, the internal container itself being connected on one side by means of ducts with incorporated by-pass valves to one or more subsidiary liquid measuring containers each of which is in turn connected by a duct having an incorporated excess pressure valve to a motor-driven subsidiary liquid pump provided separately for each subsidiary liquid, each of which pumps is connectable at will to a tank of auxiliary liquid, whilst on the other side the internal container is connected by means of a duct having an incorporated excess pressure valve to a motor-driven main liquid pump which is connected to the main liquid container; the internal container is furthermore connected to a draw-off device to be operated by the user, and the dosage container has a self-acting switch that operates when the dosage container is entirely filled.

According to a further characteristic of the invention the self-mixing dosage container is so constructed that the internal container of the draw-off container consists of a vertically positioned tube which joins up both with the top cover and the bottom cover of the dosage container and is provided with holes, and the feed duct or ducts for the subsidiary liquid issues forth at the top end of this tube, whilst the feed duct for the main liquid as well as the draw-off duct for the mixture issue forth at the bottom end of this tube.

A preferred embodiment of the invention is such that the measuring out and supply of the quantity of subsidiary liquid (e.g. lubricating oil) corresponding to the desired mixing proportions is effected entirely automatically with the aid of an automatic subsidiary liquid measuring device consisting of a piston that can move in a cylinder, which piston is moved to and fro by the pressure of the subsidiary liquid, the movement of this piston being governed by a governor piston valve which, being likewise actuated by the pressure of the subsidiary liquid, is moved from the starting position to the end position; the stroke of the piston adjustable and operating in such a manner that, by a single to-and-fro movement, if supplies the desired quantity of subsidiary liquid to the mixture dosage container, after which, as a result of operating the mixture draw-off lever interacting both with the mixture dosage container and a coin device, the governor piston valve is made to revert to its starting position.

Owing to the fact that the measuring out of the adjusted quantity of subsidiary liquid (e.g. lubricating oil) is effected entirely automatically, the operation of the apparatus is easy and the user need only set the desired mixing proportions by means of a calibrated knob or disk and deposit a token coin (or, say, a half-crown) in the slot, whereupon the apparatus fills the dosage container with the desired mixture entirely automatically. After this the user need only press down the draw-off handle in order to effect an outflow of the mixture he desires. The draw-off handle then reverts to the initial position of its own accord and the entire apparatus is ready to be operated afresh.

The automatic subsidiary liquid measuring device according to the invention possesses the characteristic that a piston can move between a fixed stop and an adjustable stop in a cylinder closed at both ends, the movement of this piston being governed by a governor piston valve permitting of movement in a housing, which governor piston valve is connected to the subsidiary liquid pump and, when at its starting position, admits the subsidiary liquid first behind one end of the piston, as a result of which the subsidiary liquid behind the other end of the piston is forced towards the mixture dosage container, after which, owing to the disconnection of a locking device, the governor piston valve is brought into its end position by the liquid pressure of the pump, and in this way the subsidiary liquid is admitted behind the other end of the piston, as a result of which the subsidiary liquid behind the initial end of the piston is forced towards the mixing dosage container, and the piston reverts to its original position, whereupon the governor piston valve is brought back in its starting position as a result of operation of the mixture draw-off device.

According to the invention the piston of the subsidiary liquid measuring device is governed by a governor piston valve device which acts in such a way that, after the piston has been moved from its starting position into its alternative or end position as a result of increase of the pressure of subsidiary liquid the governor piston valve is moved from its starting position into its alternative or end position, but as a result of operation of the mixture draw-off device the governor piston valve is brought into its starting position. The governor piston valve device for the automatic subsidiary liquid measuring device possesses the feature that the governor piston valve has a recess, furthermore, a V-shaped notch and also two channels passing transversely through the valve, the first of which channels is positioned on one side of the recess and the second channel on the other side of the recess; the housing of the governor piston valve is fitted with a locking pin that can be pushed away under the pressure of a spring, which locking pin has a spherical or V-shaped end and is positioned with this end in the V-shaped hole when the governor piston valve is at its starting position, the housing having furthermore seven liquid apertures the first of which is connected on the one side to the subsidiary liquid pump and admits liquid behind the starting position of the governor piston valve; the seventh aperture is connected to the subsidiary liquid duct leading to the dosage container and this duct connects up with the space behind the end position of the governor piston valve; the third aperture is coupled to the subsidiary liquid pump and connects it with the recess of the governor piston valve at all positions of this valve; the second aperture is connected on the one hand by means of a channel to the space behind the starting position of the piston and is on the other hand in communication with the recess of the governor piston valve when this valve is at its starting position; the fourth aperture is connected on the one hand to the space behind the end position of the piston and is on the other hand in communication with the second channel of the governor piston valve when the latter is at the starting position, which second channel at the starting position of the governor piston valve is at the same time into communication with the sixth aperture, which itself is connected to the subsidiary liquid duct leading to the dosage container; the fifth aperture is likewise connected to the subsidiary liquid duct leading to the dosage container and is in communication with the first channel of the piston valve when the latter is at its end position, which channel at that position is also in communication with the fourth aperture; furthermore, the governor piston valve has a rod passing through its housing in such a manner that on pressing against this rod the governor piston valve is set at its starting position.

Furthermore, the mixture draw-off device has the feature that, at the pressed-down position of the draw-off lever, on the one hand a mixture draw-off valve is kept open by a mixture draw-off rod and an air admission valve is kept open by an air admission rod; and on the other hand, with the aid of a second lever fitted to the draw-off lever and a pull rod interacting with this second lever, the regulating valve of the automatic subsidiary liquid measuring device can be brought back into its starting position by the operation of a releasing lever pivoted on to a spindle and a controlling rod; furthermore, in the absence of a coin, the coin device obstructs the pressing down of the draw-off lever with the aid of a lever moving under the pull of a spring, the square part of which, in the absence of a coin, arrests the extremity of the second lever that is connected with the draw-off lever.

In a special embodiment of the invention the volume of the dosage container can be altered in an easy manner and can also be precisely adjusted to a determined value. Alterations in volume may be necessary, for instance, on account of variations in prices of the liquid mixture to be apportioned, and are also necessary when the capacity of the dosage container is being calibrated to a determined value.

According to this special embodiment the invention is so constructed that the cylindrical jacket of the dosage container is fitted liquid-tight to the bottom cover and is so positioned with respect to the top cover that it is able to move liquidtight in a vertical direction but cannot rotate about its vertical axis; furthermore, the internal container consists of two parts fixed together by means of a screw thread having a vertical screw-line axis, the lower member of the two parts being fixed to the bottom cover, whilst the upper member is incorporated in the top cover in such a manner that it is able to rotate liquid-tight about its vertical axis but cannot move in a vertical direction, the assembly being such that by rotating the upper part of the internal container with respect to the top cover, the bottom part of the mixture dosage container which comprises the jacket and the bottom cover can be shifted with respect to the top cover.

By this measure the distance between the top cover and the bottom cover can be easily and precisely adjusted, so that within certain limits the dosage container can be given any desired volume.

According to a preferred embodiment of the invention the apparatus is so constructed that there is fitted inside the internal container a vertically positioned two-part operating rod for the mixture draw-off valve, the two parts of which are joined by means of a screw thread having the same pitch as, and running centrically with, the screw thread of the two parts of the internal container, the bottom part of the operating rod being so positioned with respect to the bottom cover of the dosage container that it can be moved in a vertical direction but is unable to rotate about its vertical axis, whilst the top part of the operating rod is incorporated in the upper part of the internal container in such a manner that it can move liquid-tight in a vertical direction but cannot rotate about its vertical axis, the assembly being such that on rotating the upper part of the internal container with respect to the top cover the lower part of the operating rod for the mixture draw-off valve is moved over the same vertical distance with respect to the top cover as the bottom part of the mixture dosage container comprising the jacket and the bottom cover, whilst the mixture draw-off valve can be opened and closed at will at any position of the bottom part of the mixture dosage container by altering the position of the operation rod with respect to the top cover.

By this provision the length of the operating rod for the mixture draw-off valve which is positioned inside the internal container can be made to vary in length in the same way as the distance between the top cover and the bottom cover of the dosage container, so that the action of the draw-off mechanism is not affected by any alterations in volume of the dosage container.

The dosage container may, however, be provided with a displacer which can be screwed or slide inward or outward in a manner permitting of regulation and by means of which the capacity of the dosage container can be adjusted. After adjustment the newly obtained capacity can again be calibrated, so that in case of alteration in price the new prices can be taken into account.

A further object of the invention is to obviate the possibility of drawing off liquid from the mixture dosage container if for any reason, e.g. a fault, the amount of subsidiary liquid has not, or has not fully, flowed into this container, which would mean that the operator of the apparatus would only draw off the pure main liquid or main liquid mixed with a lower percentage of subsidiary liquid, e.g. lubricating oil, than is intended.

According to this embodiment of the invention the apparatus is so constructed that the pivoted releasing lever for the governor piston valve is on the one hand connected to the pull rod by means of a cam positioned in an oblong hole and is on the other hand connected to this pull rod by a draw spring, whilst the second lever, which turns together with the controlling lever and whose end can rest against a cam or edge of the pull rod, is only able to move this pull rod in the direction at which the draw spring can be tensioned and at which the governor piston valve will move back to its starting position, the assembly being such that if the governor piston valve is not in the position farthest away from its starting position and thus the supply of the selected amount of subsidiary liquid is not fully completed, the controlling lever will invariably become locked when an attempt is made to open the mixture draw-off valve by means of this controlling lever, because in that case the spring that actuates the locking lever can at the same time move the pull rod and releasing lever assembly, but when the governor piston valve is at the position farthest removed from its starting position and the spring of the locking lever is thereby prevented from moving the draw spring along with it in spite of the presence of the oblong hole, the action of the spring between the pull rod and the releasing lever being stronger than the action of the spring of the locking lever, the locking action then depends only upon the position of the coin in the coin guide and is not impeded until the coin has arrived at its final position in the coin guide as a result of complete filling of the mixture dosage container, at which position the action of the spring of the locking lever is blocked.

This measure affords an additional locking facility, as the coin cannot drop into its final position at which the action of the spring of the locking lever is blocked, until the governor piston valve has come into the position farthest removed from its starting position, and only can liquid be drawn off.

By way of example the apparatus will be described by reference to the outline drawings in which the main liquid, petrol, is kept in an underground container.

Obviously, however, the apparatus is also suitable for a variety of other similar purposes and can be constructed in different ways. Thus, one may for convenience's sake provide only one grade of lubricating oil, in which case there need only be one subsidiary liquid measuring container. The inclusion of a coin-in-slot device in the apparatus is not essential either, it being possible to prepare the apparatus for use by more simple means, as for instance by insertion of a key in a lock, the turning of an operating handle or similar contrivance. The latter means in particular will be found very convenient if the method of mixing and re-mixing which the invention provides is used for industrial purposes. It is also possible to measure out and mix other liquids than those mentioned in the present embodiment, and the main liquid need not be kept under the ground if it is not an inflammable or otherwise dangerous liquid.

Figure 4:
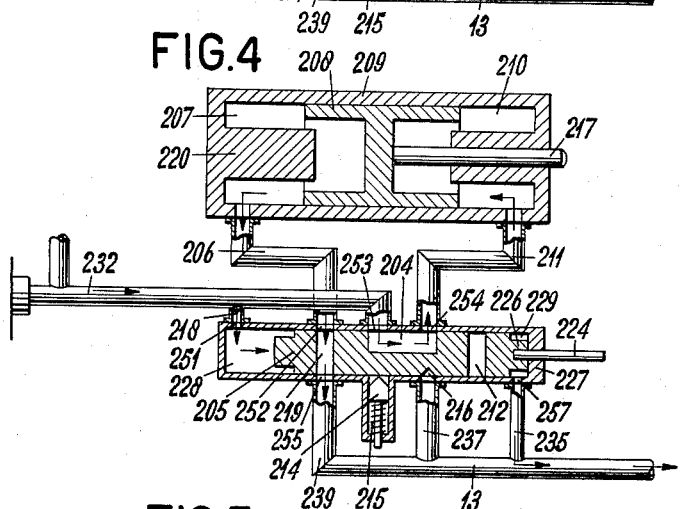
Figure 5:
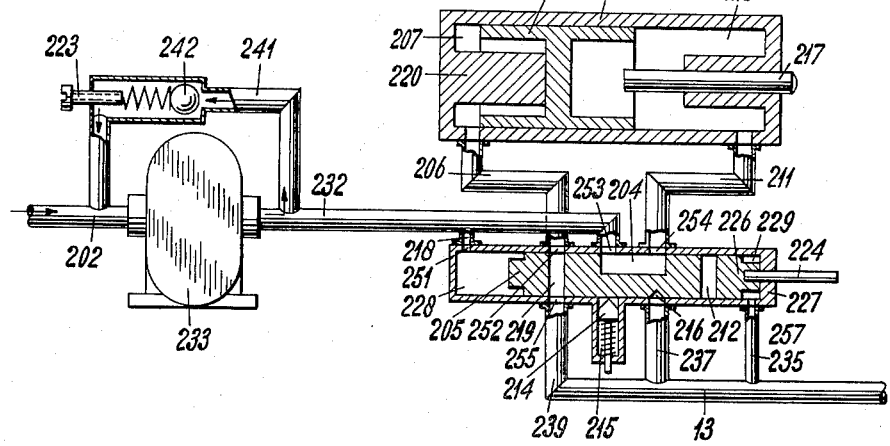
Figure 6:
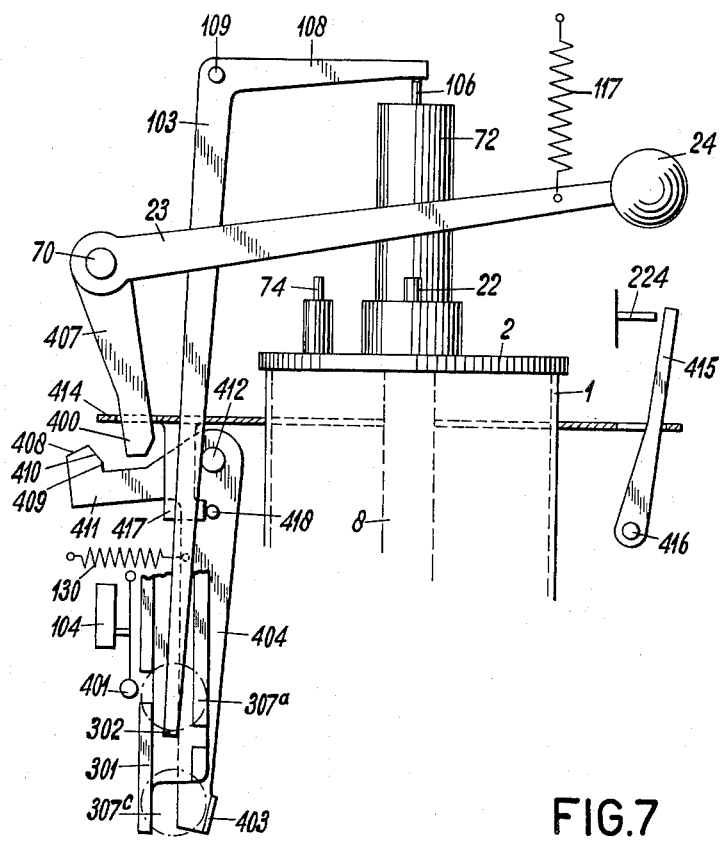
Figure 7:
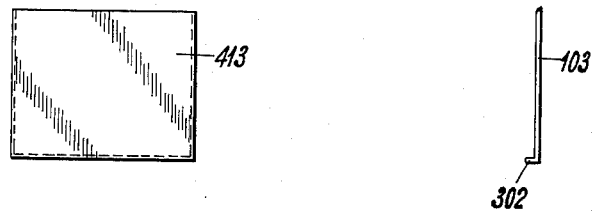
Figure 8:
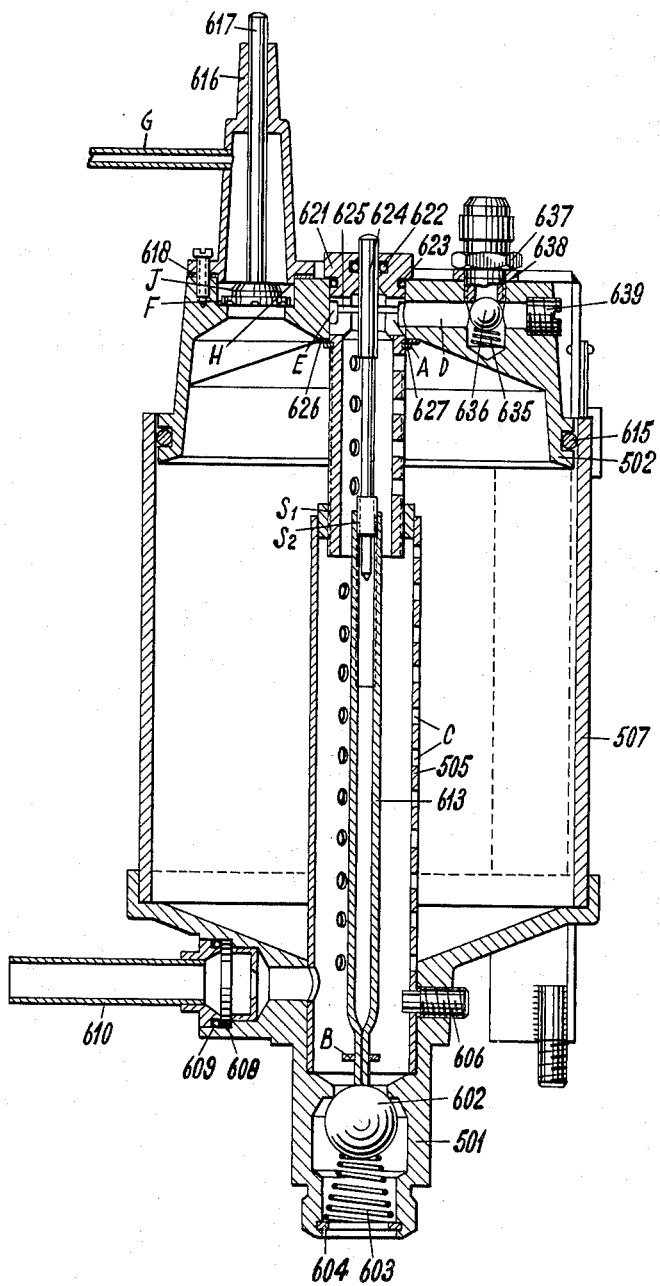
Figure 9:
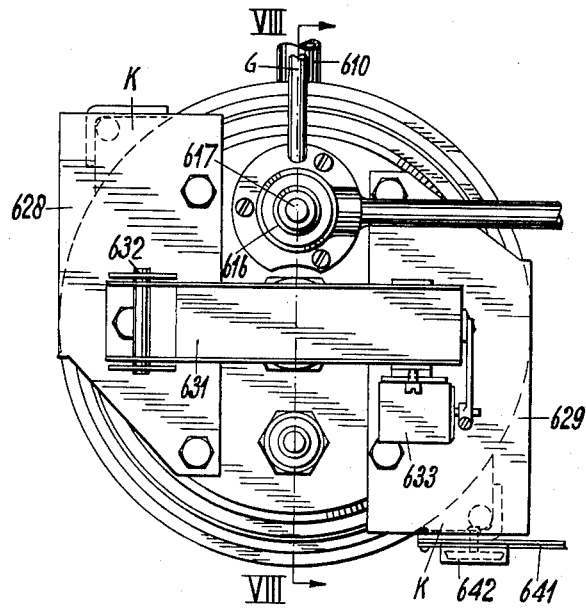
Figure 10:
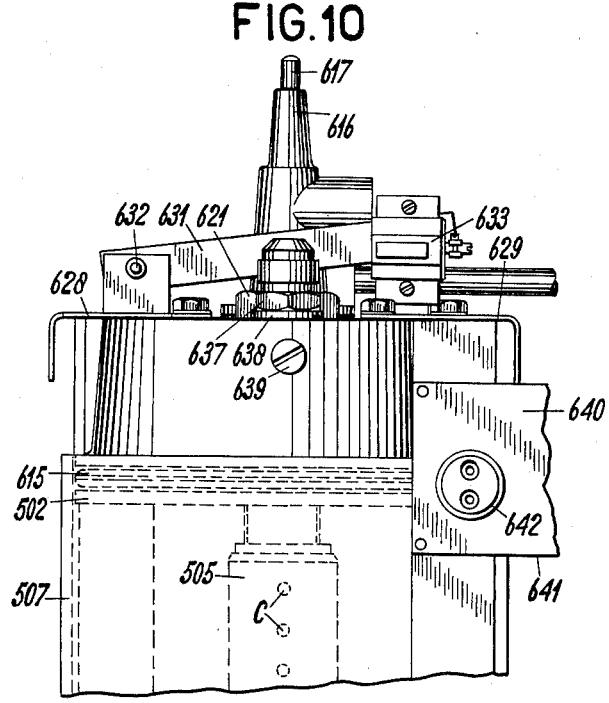
Figure 11:
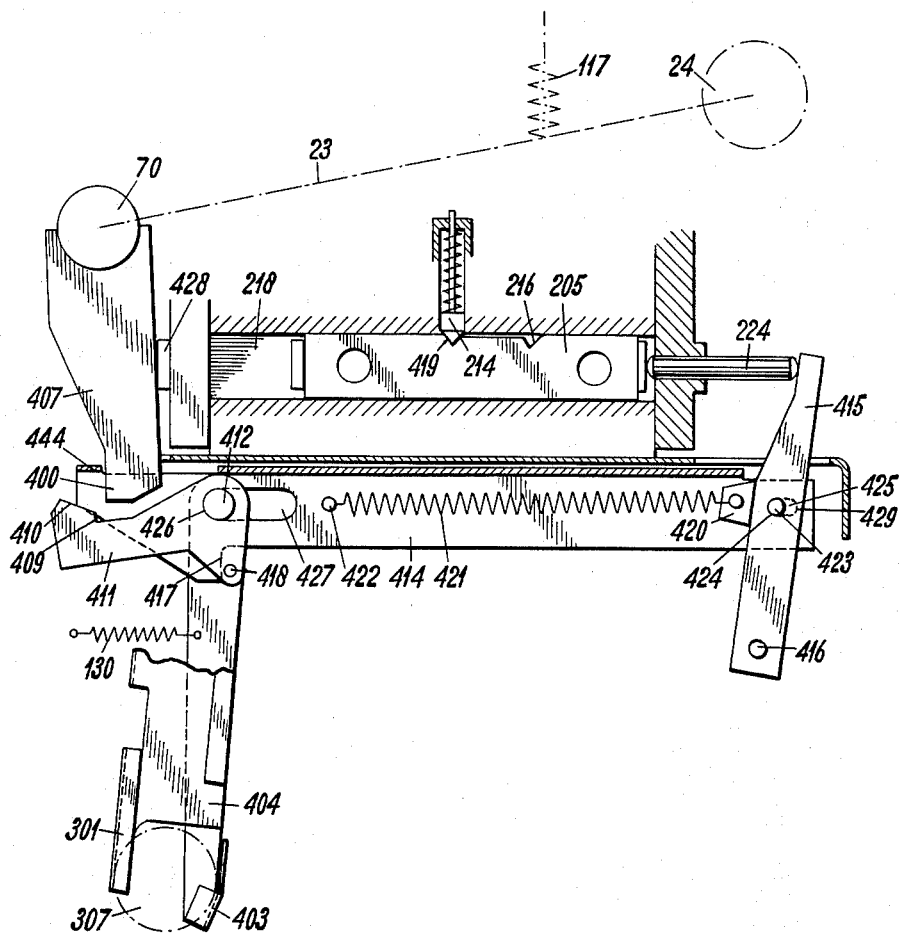
Figure 12:
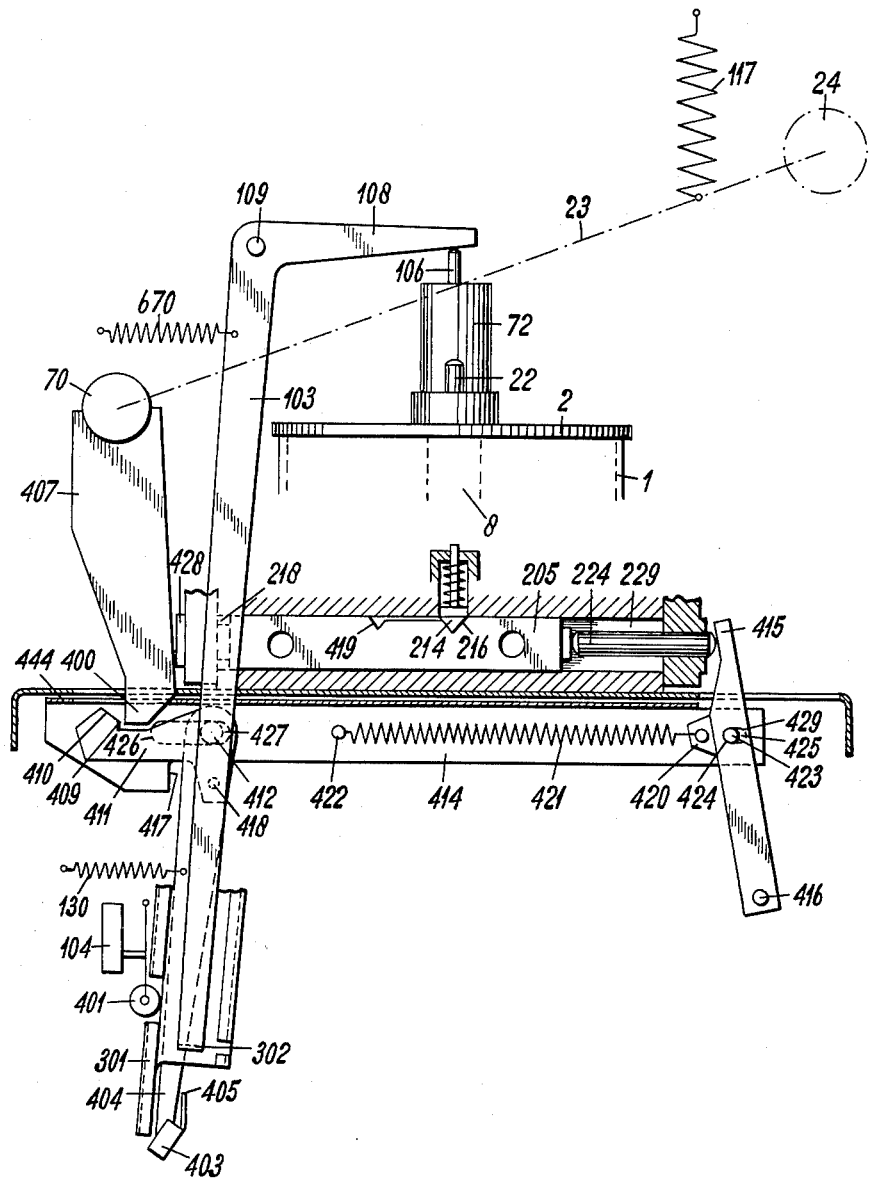
Figure 13:
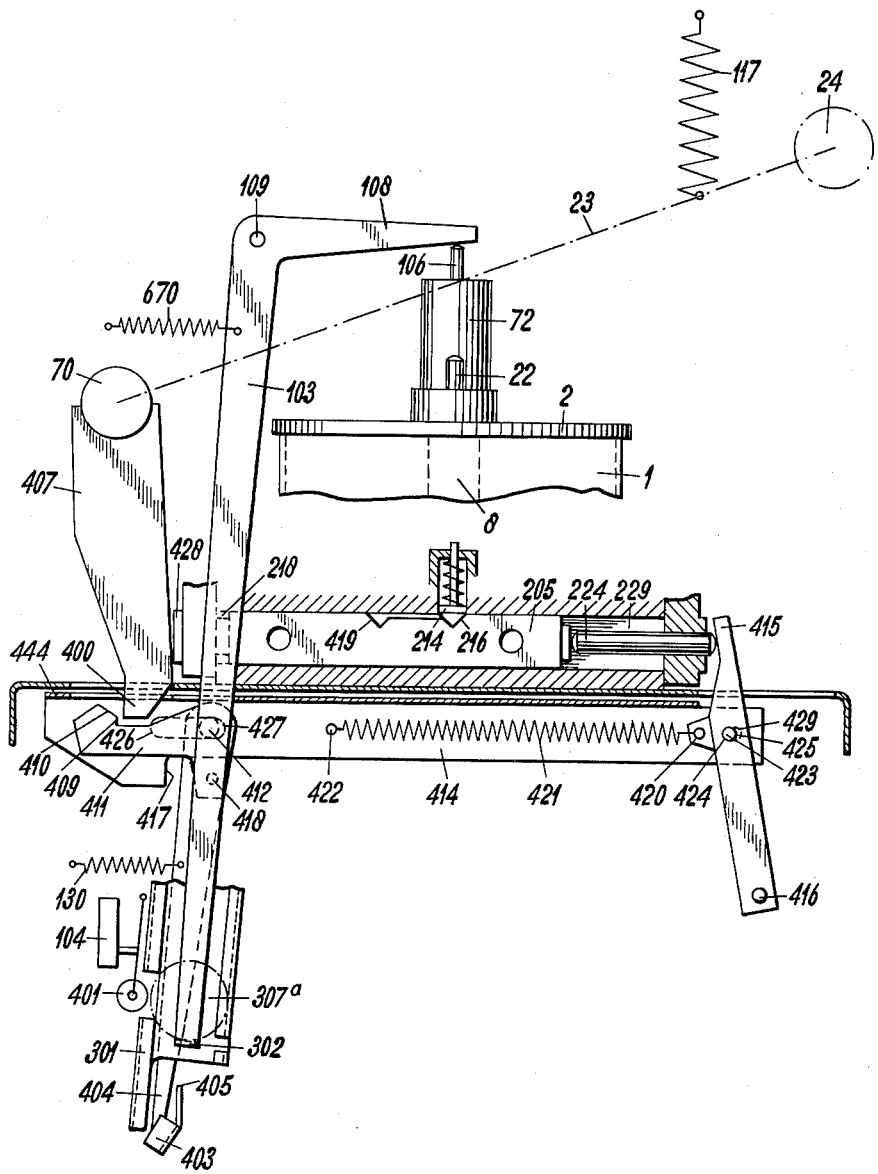
Figure 14:
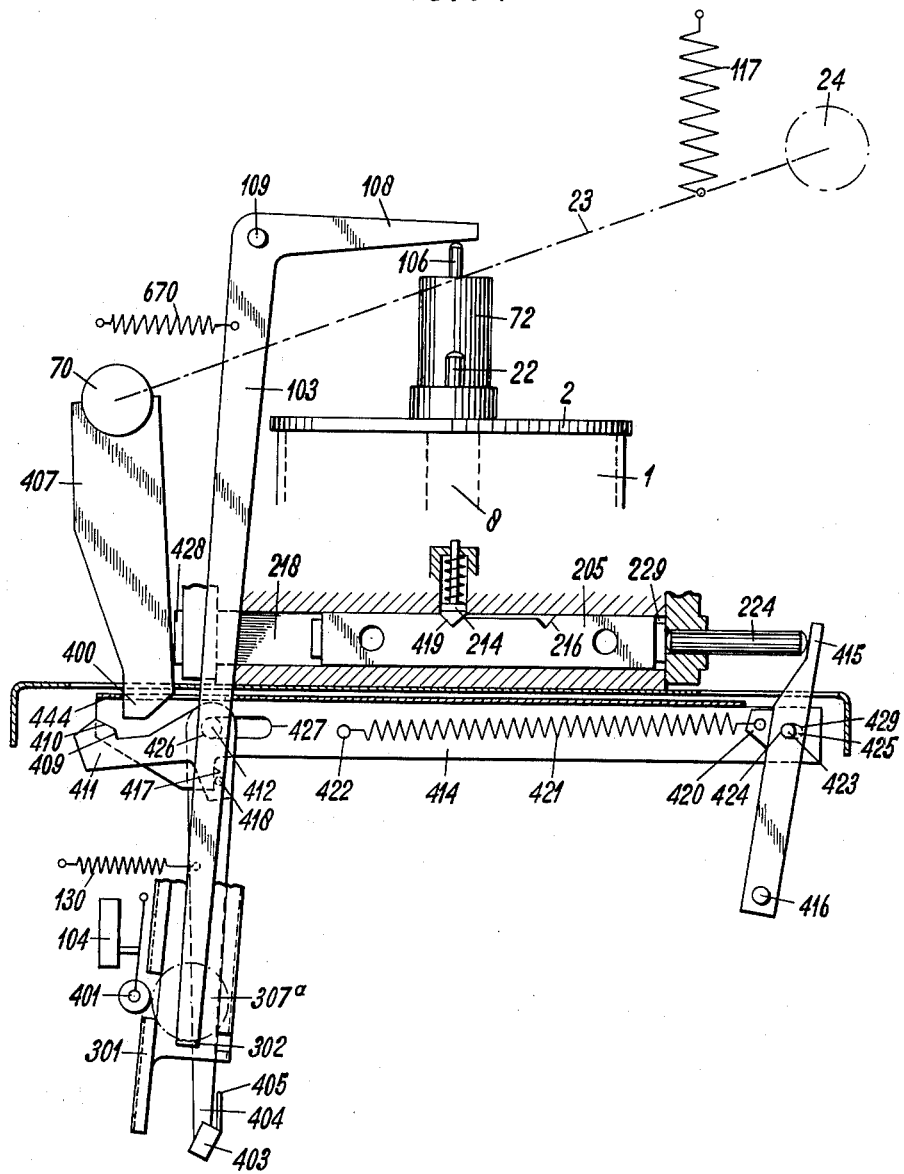

FIGURE 1 of the drawings gives an exterior view of the casing for the coin-in-slot device, embodying the mixture dosage container, the lubricating oil measuring device and the pumps, on the outer panel of which are the controls, the graduated scale for the mixing proportions, the slot for insertion of the coin, an inspection glass, the draw-off hose-pipe and further appliances;

FIGURE 2 shows a cross-section of the dosage container in an initial embodiment and a diagram of the connecting leads of the dosage container together with the lubricating oil measuring device, the lubricating oil pumps, the petrol pump and their driving units with further details;

FIGURES 3, 4, and 5 the automatic lubricating oil measuring and delivery device at different slide positions of the governor piston valve;

FIGURE 6 a detail of the coin-in-slot device and its interaction with the mixture draw-off lever and the mixture dosage device according to an initial embodiment;

FIGURE 7 a detail of FIGURE 6;

FIGURE 8 a section of the mixture dosage container in a second embodiment, the capacity of which can be varied;

FIGURE 9 a top plan view of the dosage container according to FIGURE 8;

FIGURE 10 a partial side view of the dosage container according to FIGURE 8;

FIGURE 11 details of the locking device between the governor piston valve and the draw-off device; according to the coin-in-slot device of the FIGURES 7, 6, whereby the details of the governor piston valve itself are not shown;

FIGURE 12 the initial position of the coin-in-slot device of FIGURE 6 and the locking device of FIGURE 11 when no coin has been inserted;

FIGURE 13 the position of the device of FIGURE 12 just after a coin has been inserted, so that the coin is in position 307A, the governor position valve is still in its left hand position and the oil mechanism has not yet acted, and no oil and no petrol or hardly any petrol has yet flown into the container;

FIGURE 14 the same device as FIGURE 13 when the oil mechanism has acted properly;

FIGURE 15 the same device as FIGURE 13 when the mixture draw off handle is pressed down too early and consequently is locked;

FIGURE 16 the same device as FIGURE 13 when the container is full but the oil mechanism has not acted properly, so that by pressing down the mixture draw off handle this handle is locked;

FIGURE 17 the same as FIGURE 13, when, all mechanisms have acted properly so that by pressing down the mixture draw off handle will not be locked and the mixture can be drawn off.

Item 1 in FIGURE 2 is the dosage container, with top cover 2, bottom cover 3 and the tubular internal container 4.

The internal container 4 joins up liquid-tight at 5 and 6 with the two covers and has a number of holes 7 through which the space 8 surrounded by the internal container is in communication with the remaining space 9 of the dosage container, so that liquid flowing into the internal container has to pass through the holes 7 in order to enter the space 9, and vice versa.

Mounted on the top cover and affording connection with the internal container is a hollow cap 10 whose interior 11 is in unobstructed communication with the space surrounded by the internal container, the feed ducts for the subsidiary liquids being connected to this top 11.

Connected to the top cover 3 is the feed duct 16 for the main liquid, in this example petrol. The petrol can pass via a retaining valve 17 into a cavity 18 of the bottom cover, which cavity itself is in unobstructed communication with the space inside the internal container 4. The petrol can thus only pass into the space 9 of the dosage container via the holes 7. At the bottom of the cavity 18 there is a drainage aperture with a drainage valve 19, which valve is pressed by a spring 20 on to the valve seat 21 but can be opened with the aid of a rod 22 passing through the interior of the tubular internal container 4 and through the wall of the cap 10, and can be operated at the top of the dosage container. On pressing down a lever 23 with the aid of a handle 24, the rod 22 opens the valve 19 and at the same time opens the air inlet valve 75, allowing the mixture in the dosage container to flow out through an outlet pipe or duct 25 via the holes 7, the internal space of the internal container, the cavity 18 and the opened valve 19.

The jacket 1 of the dosage container may be made of a transparent material, e.g. a plastic. When this dosage container is placed behind a glass pane or an inspection glass 27 (FIGURE 1), the tube 4 with holes 7 is visible from outside and the operator can watch the whole process of supplying liquid, mixing and drawing off and can also see when the dosage container is entirely filled.

The mixture of petrol and oil is passed into the tank of the autocycle by means of a flexible hose-pipe 28 (FIGURE 1).

The dosage container with its controls and appurtenances and the lubricating oil measuring device with its accessories are installed in a casing 29 (FIGURE 1) which is fitted to the wall. The pumps for supplying the lubricating oil and petrol and the corresponding ducts are similarly housed in this casing. The tanks for the oil and petrol are separately positioned, the petrol tank being installed under the ground in the usual way.

A measuring device 200 for measuring the desired quantity of lubricating oil is seen in FIGURE 2. The lubricating oil measuring device is on the one hand in communication with the duct 13 leading to the dosage container and on the other hand with a duct 37 communicating with a geared pump 39 which pumps the lubricating oil out of an oil tank. The pump 39 is driven via a shaft 34, a worm wheel 35 and an endless screw 36. A second pump for an alternative grade of lubricating oil may be mounted on the other side of the shaft.

During the running of the motor the pump 39 is constantly pumping.

The same motor 36 that drives the oil pump can also be used to drive the petrol pump 47. The petrol pump is a membrane pump which pumps the petrol via the upward pumping duct 48 and the feed duct 16 via the internal container 4 into the dosage container 1. The capacity of the pumps is such that the time taken by the petrol pump for complete filling of the dosage container is sufficient for thoruogh mixing of the oil with the petrol. It is also clear that the pump 47 can at once pump the petrol from the normally existing underground petrol tanks and that the use of the apparatus according to the invention is in no way detrimental to safety, which is an outstanding advantage.

The petrol pump 47 has a membrane 49 which is actuated by the rod 50. Furthermore, an admission valve 51, an exhaust valve 52 and a by-pass duct 53 with an incorporated excess pressure valve 54 are provided. When the dosage container is filled the driving motor for the pump is in fact automatically stopped by a device still to be described, but as this stoppage does not take place immediately, the by-pass duct with its excess pressure valve 54 ensures that the pressure will not rise too high. The petrol feed duct 16 has furthermore a retaining valve 17 at its outlet in the cavity 18 of the bottom cover.

The setting of the valves is selectable at will.

Passing on to the description of the automatic lubricating oil measuring device 200 according to FIGURES 3, 4 and 5, item 233 in FIGURE 3 is the lubricating oil pump, which again has a by-pass duct 241 with an incorporated excess pressure valve 242 whose spring tension can be adjusted by means of the screw 223.

The measured quantity of oil is forced into the mixture dosage container 1 by the pressure of the oil pump 233 itself. The oil pump 233 has the same task as the pump of FIGURE 2. The lubricating oil measuring device has a cylinder 209 containing a piston 208, the to-and-fro movement of which is governed by a governor piston valve 205 that can be moved to and fro in a slide housing 227. The stroke of the piston 208 can be adjusted by means of the movable slanting track 225 which can be set by a disk or knob on the outside of the casing, the desired quantity of lubricating oil being supplied by a single to-and-fro movement of the piston. When the adjusting disk 263 for the mixing proportions is set at a certain position at which the slanting track 225 has a certain position with respect to the adjustable stop pin 217, the piston 208 is able to move over a certain distance before its movement is arrested by the stop pin 217 striking against the slanting track 225. In accordance with FIGURE 3, when the governor piston valve is at this position, the lubricating oil pump will pump the lubricating oil through the duct 232, through the recess 204 of the governor piston valve, through the passage 206 and finally into the space 207 behind the piston 208. The piston will thus be moved to the right over a certain adjusted distance. Lubricating oil is also present in the space 210 at the other end of the piston, and during the movement of the piston to the right this lubricating oil is displaced and flows through passage 11, through a passage 212 incorporated in the governor piston valve 205, through passage 13 into the mixture dosage container 1, see also FIGURE 2. When the piston 208 has come into its extreme position and presses against the stop pin 217 the oil pressure in the space 207 will rise, and as a result the governor piston valve 205 is shifted to the right. This governor piston valve is in fact held into position by a resilient pin 214 which has a tapering or spherical end and is under the pressure of a spring 215. At the position according to FIGURE 3 the tapering or spherical end is situated in the V-shaped recess 216 of the governor piston valve. When the pressure of the oil in the duct 232 rises, this pressure will be exerted via passage 218 behind the governor valve.

For this purpose the governor piston valve has a recess 228. As the recess 216 has slanting side walls, on increase of the oil pressure in the space 238 sufficient force will be exerted on the governor piston to ensure that the slanting wall of the recess 216 will push away the resilient pin 214.

In this way the governor piston valve can move to the right, coming into the position shown in FIGURE 4. The passages 212 and 219 as well as the recess 204 have now acquired a new position as a result of which the lubricating oil passes out of the duct 232 into the passage 211 and comes into the space 210 behind the piston 208. The piston is thereby pushed more to the left until it strikes against the fixed stop 220 and, in doing so, forces the oil that is in the space 207 through the passage 206, through passage 219 of the governor piston valve and through duct 13 to the mixture dosage container 1. The piston has now completed a single to-and-fro movement and the quantity of lubricating oil that has been adjusted by means of track 225 and pin 217 is supplied to the mixture dosage container. The governor piston valve is, however, still in the FIGURE 5 position, i.e. to the right. The lubricating oil no longer has any outlet when the piston has reached its extreme left position and strikes against the fixed stop 220. The result is that the excess pressure valve 242 of the pump comes into action, that is, opens against the pressure of the spring, and the pump 233 circulates the oil through the by-pass duct 241 (FIGURE 5).

To enable the governor piston valve to be pushed back to the left and hence to the FIGURE 3 position this slide has a push-back pin 224 which is passed with good closure through a hole in the valve housing 227. As shown by FIGURE 6, a lever 415 turning around a pivotal point 416 can be pressed against the push-back pin 224. When the self-service operator presses down the handle 24 with lever 23 in order to draw off the liquid mixture, the lever 415 is moved at the same time and the governor piston valve 205 is again moved to the left with the aid of the push-back pin 224 until the FIGURE 5 position is reached. The lubricating oil measuring device is now again at the starting position and is in readiness at the next time of operation for supplying a fresh quantity of oil to the then re-emptied mixture dosage container 1.

It is obvious that as a result of leakages oil will get behind the right-hand end of the governor piston valve, into the space 229. On this account a leakage duct 235 is provided through which the oil that is present in the space 229 can always be forced back into the duct 13.

The movable slanting track by means of which the movable stop pin can be adjusted is connected with the adjusting knob or adjusting disk 263 situated on the front of the casing (FIGURE 1). This adjusting disk is calibrated in the mixing proportions. The self-service operator sets the adjusting knob at the desired mixing proportions, inserts his coin (or token coin) in the slot 77 and, when the mixture dosage container is completely filled with the selected mixture, he need only operate the handle 24 in order to draw off his mixture. By such operation the entire mechanism is, moreover, brought back to the starting position.

The interaction of the mixture dosage container 1 with the governor piston valve 205 and with the coin-in-slot device is shown in an initial embodiment in FIGURE 6. When there is no coin in the coin-in-slot device the square part 409 of the cam on the lever 411 effects the locking of the lever 407 and it is not possible to draw off liquid; in other words, the operating handle 24 is blocked as a result of the action of the spring 130, as will be described later.

When however, a coin is inserted in the slot 77 (FIGURE 1), it drops via a coin assayer (not shown) into the coin guide 301 (FIGURE 6) and comes to rest on the turned-down end 302 of the lever 103, see also FIGURE 7. The lever 103 can turn around an axis 109 and is fitted with a transfer lever 108 which can be operated by the rod 106 and the pressure switch 72. The coin reposing on the turned-down end 302 presses against the roller 401 of the micro-switch 104, as a result of which the motor is switched on and the pumps fill the mixture dosage container 1. When the dosage container is entirely full the pressure switch 72 comes into action in such a way that its rod 106 pushes the lever 103 upward, thereby pushing aside the lever 103 with the turned-down end 302. In this way the coin is released and continues to drop, so that the roller 401 is released and the motor stops. The coin now drops between the wall of the coin guide 301 and the slanting part 403 of the lever 404. This lever 404 can be turned around an axis 412 and is under the action of a spring 130; moreover, it has an arm 411 with a locking and operating cam. At the position shown in the drawing, however, no locking of the lever 407 is possible, as the coin keeps the lever 404 pushed aside, and the square part 409 of the cam is beyond reach of the arm 407.

The draw-off lever 23 with handle 24 is pulled upward by spring 117 and can turn around the axis 70. With the turning of this lever 23, lever 407 turns as well. The downward movement of the handle 24 has various consequences. In the first place the rod 22 of the dosage container is moved, as a result of which the mixture is drawn off, and the rod 74 is moved, causing the air inlet valve to open, so that air can flow into the dosage container. Furthermore, the end 400 of the lever will press against the slanting part 410 of the cam of lever 411, so that this lever 411 will move further downward, as a result of which the turned-down end 302 turns sideways and releases the coin, which now drops into the coin tray 413. The turning of lever 407 also moves the pull rod 414, as lever 407 passes through an opening in this pull rod. A lever 415 which can turn around an axis 416 passes through another opening to the pull rod 414, and when the pull rod is moved the lever 415 will push against the push-back pin 224 of the governor piston valve 205 and will bring the slide of this valve back into its FIGURE 3 position.

Now that the coin has dropped into the coin tray 413 there is no longer a coin between the slanting part 403 of lever 404 and the wall of the coin guide 301, so that the spring 130 can pull lever 404 towards it. At the position of lever 407 shown in FIGURE 6, at which the handle 24 is at its uppermost position, the pin 418 of lever 404 rests, however, against the cam 417 which is attached to the pull rod 414, so that the spring 130 cannot pull lever 404 towards it. When, however, the handle 24 and hence the lever 23 is pulled downward, which is the case during drawing-off of the mixture and in which operation the coin drops into the coin tray, the movement of the pull rod 414 is accompanied by movement of the cam 417, and the pin 418 is released from this cam. This effects blocking of the handle 24 if it is moved without a coin having previously been inserted in the slot. In fact, if there is no coin in the coin guide, it will mean that during the pressing down of the handle 24 and the accompanying movement of the pull rod 414 the spring 130 will pull the arm 404 towards it, in consequence of which the arm 411 will move upward and the square part 409 will block the movement of lever 407 owing to the fact that the end 400 strikes against the part 409, so that the lever 24 cannot move any further either.

Summarizing, the handle 24 with levers 23 and 407 are thus blocked when no coin has been inserted in the apparatus, but after the insertion of a coin the operation of the handle 24 not only releases the coin but also operates the drum-off device, sets the governor piston valve of the lubricating oil dosage device at its starting position and also cuts out the blocking of the arm 407, whilst by finally returning the handle 24 to its starting position the entire mechanism is brought into readiness for being operated afresh. Outside, on the casing, there is a graduated scale 263 (FIGURE 1) or similar device which can be calibrated in the mixing proportions of the petrol mixture as obtained after complete filling of the container, the scale thus indicating, say, the numerical values from 1:30 to 1:10. By rotating a knob provided with a pointer which is thereby moved over the graduated scale, the slanting track 225 is moved. Every user can therefore select the mixing proportions which he desires for his motor.

The draw-off lever 23 with handle 24 is rotatably fixed by means of a pivotal point 70 to the top cover 2 of the dosage container or to a projecting part thereof.

If desired this pivotal point may be positioned on the apparatus.

When the petrol pump 47 is working the petrol flows via the cavity 18 into the tubular internal container 4 and further through the holes 7 into the dosage container. At the same time the selected quantity of lubricating oil is introduced into the internal container. When lubricating oil has been flowed in it will for the most part be positioned directly over the valve 19 of the bottom end of the internal container. By the operation of the petrol pump the valve 17 opens and petrol flows in, thereby pushing the lubricating oil ahead of it and flowing together with the lubricating oil through the numerous holes 7. In this way an intensive mixing of the petrol with the lubricating oil is effected, which continues as long as there is still petrol flowing in through 17. When finally the dosage holder in entirely filled, the motor is automatically disconnected. In FIGURE 2 this is the same motor that drives the lubricating oil pump. This disconnection is effected with the aid of the pressure switch 72 (FIGURE 2). A float piston of this switch will be pushed upward by the rising petrol and a switch or micro-switch will be operated which switches off the motor for the pumps or causes this to be effected. As an additional facility a signal may be given or a pilot lamp may light up as a sign that the dosage container is completely full.

A practiced self-service operator will hear this by the fact that the motor stops running. The mixture can now be drawn off, for which purpose the operator pulls down the handle or knob 24. As a result the rod 22 will first open valve 19, and immediately afterwards the air inlet valve 75 is opened. With the aid of a rod 74 the lever 23 pushes open this air inlet valve 75, which is mounted on the top cover of the dosage container. This valve is kept on its seat closed by a spring 76. The aperture 73 now admits such a quantity of air that the mixture can easily flow away through valve 19, which is constantly kept open. The operator thus holds the handle 24 down with one hand, whilst with the other hand he takes hold of the hose-pipe 28 (FIGURE 1) through which the mixture is led into the petrol tank of the autocycle. If at a given moment this tank should be in danger of overflowing, valve 19 can always be closed in good time by releasing the handle 24, as spring 117 then moves the lever back into the starting position.

The pressure switch 72 also effects air release during the inflow of petrol; in other words, it allows air to escape from the dosage container according as the liquid in this container rises to a higher level.

The construction of the pressure switches is such that these switches effect the admission of air into the dosage container during the drawing-off of the mixture.

The capacity of the dosage container can be readjusted by means of a displacer, not shown in the drawing. This displacer can, for instance, be screwed or slid up and down in the top cover 2 and be secured or sealed in a given position.

The displacer may be a hollow tube closed on all sides, which tube is made to occupy more or less space in the dosage container and thus permits the adjustment or calibration of the quantity of mixture to be delivered. The adjustability may also be utilized for adopting the apparatus to altered price conditions.

The coin may, for instance, be a token coin that can be bought at a petrol filling station, or may be an actual coin of the realm. Only with the aid of this coin or token coin can be set working the apparatus, which is not only a preventive against operation by other than those concerned, but renders it possible also at night for those concerned to obtain petrol in the desired mixing proportions.

The motor or motors cause all the pumps to operate until the dosage container 1 is completely filled and the motor or motors are switched off as a result of the pressure switch coming into action.

The pressure switch 72 comes into action as a result of complete filling of the dosage container.

The operator can draw off his mixture. With one hand he places the nozzle 105 (see FIGURE 1) of the flexible hose pipe 28 in the filling aperture of his petrol tank, and with the other hand he moves handle 24 downward so that the lever 23 is also moved in a downward direction.

After release of the handle 24 the spring 117 (FIGURE 2) again brings lever 23 into the starting position.

The embodiment in which the capacity of the mixture dosage container can be adjusted at will is shown in FIGURES 8, 9, and 10. In these embodiments 501 is the bottom cover of the dosage container, 507 the casing, which has the form of a transparent cylindrical casing, and 502 the top cover.

The casing 507 is fixed liquid-tight to the bottom cover. The top cover has a circular groove in which a gasket ring 615 is fitted. The lower part of the dosage container, comprising the bottom cover 501 and the casing 507, can thus be moved up and down with respect to the top cover 502 while maintaining good closure, so that the volume of the dosage container can be altered. Fitted to the top cover 502 are two guides into which the bottom cover can be guided by means of two cams. The bottom cover with casing thereby prevented for rotating about its vertical axis with respect to the top cover. Situated inside the cylindrical dosage container and concentrically with it is the top-part internal container, which is provided with holes C and acts as a mixing tube. The lower part 505 is fixed to the bottom cover, the upper part 621 is incorporated in the top cover in such a manner that it can rotate with liquid-tight closure but cannot be moved in a vertical direction.

Liquid-tight closure is again effected by means of a gasket ring 623 fitted in a ring groove. The two parts are joined together with a screw thread S1. The top end of the upper part 621 projects above the top cover 502. By rotating this upper part 621 the two parts 621 and 505 of the internal container are screwed farther or less far apart and the bottom cover with casing is moved upward or downward. When the volume of the dosage container has thus been brought to the correct value, this position can be sealed.

Positioned concentrically with the internal container 505, 621 is the draw-off rod for the drainage valve. Slightly above this drainage valve the petrol feed duct issues forth into the lowermost space of the internal container.

In order to permit of altering the length of the draw-off rod in accordance with the distance between the two covers, the draw-off rod consists of two parts, viz. a lower part 613 and an upper part 624. These two parts are joined together with a screw thread S2 having the same pitch and direction of slope as the screw thread S1 of the internal container. The two screw threads are positioned concentrically, and the lower part 613 of the draw-off rod is supported in the movable part of the dosage container in such a manner that it can move in a vertical direction but cannot rotate about its axis, such support being provided by means of a plate B with a rectangular hole, which plate is positioned in the lower end of the bottom part of the internal container.

The upper part 624 of the draw-off rod is fitted in the upper part of the internal container in such a manner that it can be moved in a vertical direction with liquid-tight closure but is not rotatable. Liquid-tight closure is effected by means of a gasket ring 622, whilst the upper part 624 of the draw-off rod is prevented from rotating in the upper part 621 of the internal container by means of a peg 625 fitted to the draw-off rod, which peg 625 can slide up and down in vertical slotted holes A of the upper part 621 of the internal container. These slotted holes are also used for supplying the lubricating oil to the internal container, because on one side they issue into the turned channel B in the upper part of the internal container, and on the other side into the interior of the internal container.

This channel joins up with the oil feed passage D. In this channel D there is a retaining valve 636 under the pressure of a spring 635.

Rotation of the upper part 621 of the internal container not only moves the bottom cover with casing in a vertical direction, but at the same time the draw-off rod is altered in length to the same extent, so that the operation of the drainage valve 602 is independent of the adjusted volume of the dosage container. Prior to operation of the draw-off rod this rod projects slightly above the internal container.

FIGURE 11 shows the embodiment with locking device, in which no mixture can be drawn off by means of the draw-off lever 23 if the automatic lubricating oil dosage device has not operated properly.

FIGURE 11 shows the governor piston valve 205 with the slide at the position farthest away from its starting position. This governor regulating valve governs the operation of the lubricating oil dosage device. At the position shown in the drawing the resilient pin 214 is in notch 419 of the slide, whilst at the starting position this resilient pin 214 is in notch 216. At the starting position the slide of the governor piston valve is therefore shifted to the left with respect to the position shown in the drawing.

The lubricating oil feed device is contrived in such a manner that at maximum pressure in the lubricating oil feed duct one can be certain that the whole quantity of lubricating oil selected by means of the selecting knob has flowed into the dosage container, and also that at maximum pressure in the lubricating oil feed duct the setting of the governor piston valve 205 has been selected entirely according to the position shown in the drawing, in which the pin 214 is caught in notch 419.

At maximum pressure of the lubricating oil the slide of the governor piston valve 205 cannot therefore remain at an intermediate position, but is unfailingly brought into the position shown in the drawing, because then the pressure of the lubricating oil in the space 228 to the left of the valve slide is a maximum. The fact that the resilient pin 214 has caught in notch 419 thus ensures that the lubricating oil has been sufficiently subjected to pressure, and also ensures that the lubricating oil dosage device has operated properly and that the selected amount of lubricating oil has flowed into the mixture dosage container.

By means of a pin 224 fitted liquid-tight, the slide of the governor piston valve can push aside the releasing lever 415 which is rotatable about an axis 416, and by means of the releasing lever 415 the valve slide 205 can again set at its starting position via the pin 224. Fitted to the releasing lever 415 is a pin 423 which is situated in an oblong hole 425 in the pull rod 414. Starting from the position shown in the drawing, the pull rod 414 can thus be moved to the left over the latitude allowed by the oblong hole 425 before the pull rod is able to exert force upon the pin 224. Furthermore, a draw spring 421 is provided which has one end fixed by means of a pin 422 to the pull rod 414, whilst its other end is fixed to the releasing lever 415 by means of a cam 420 on the releasing lever. In the position shown in the drawing the spring 421 keeps the pull rod shifted to the right, so that the edge 424 of the oblong hole 425 is pressed against the pin 423 of the releasing lever 415. The edge 426 of a second oblong hole 427 affording greater latitude of movement rests against the spindle 412.

The pull rod 414 has a cam whose edge 417 presses against a pin 418, which is fixed to the pivoted coin lever 404. This coin lever is fixed to the spindle 412, attached to which there is also a locking arm 411 which has a locking and operating cam 409-410.

This cam is provided with a locking face 409 and an operating face 410.

The coin lever 404 has one end of a draw spring 130 attached to it, which draw spring tends to move the locking and operating cam upward, but at the position shown in the figure the draw spring 421 holds this cam 409-410 down against the force of the spring 130, as the pin 214 is caught in the notch 419.

The operating lever 23 with handle 24 is held up by the draw spring 117. This operating lever 23 is fixed to a spindle 70 to which a second lever 407 is also attached. The second lever 407 has its end 400 projecting through a slot in the pull rod 414 and rests on the one hand against a stop cam 428, whilst on the other hand its end 400 is positioned close to an edge 44 of the slot in the pull rod. By pulling the handle 24 down against the force of the spring 117, the pull rod 414 is moved to the left and can carry the releasing lever 415 along with it as soon as the pin 423 rests against the other wall 429 of the oblong hole 425.

At the position shown in the FIGURES 11 and 17 at which one can be certain that the entire selected quantity of oil has flowed into the mixture dosage container, on pressing down the lever 23 the pull rod 414 will first move over the comparatively small latitude allowed by the oblong hole 425, the spring 421 being further tensioned. The locking and operating cam 409-410 will now come sufficiently high up to block the second lever 407 when there is no coin between the fixed wall portion 301 and the wall portion 403 of the coin guide that is in contact with the rotatable coin lever 404, that is, when the coin deposited is no longer in its final position 307 in the coin guide.

If, however, there is a coin between the wall portions 301 and 403, the rotatable fitted coin lever 404 and the attached locking arm 411 are unable to turn, so that cam 417 of the pull rod 414 moves away from cam 418 of the coin lever, and there is no blocking of the operating lever 24 with its attached second lever 407. The end 400 of the second lever 407 now pushes against the oblique operating face 410 of the cam, pushing this cam downward, as a result of which the coin 307 which was clamped between the wall of the coin guide 301 and the end 403 of the rotatable coin lever 404, is released and drops into the coin receptacle. The handle 24 can now be moved down further so that the valve slide 205 is also slid back to its starting position, so that the pin 214 will be in the notch 216 and hence in its initial position. As the same time the mixture dosage container is opened and the mixture can flow off.

If, however, the lubricating oil dosage has ceased to operate or to operate properly, the maximum lubricating oil pressure will not have been reached and the slide of the governor piston valve will not have come into the position shown in the figure but will be in a position more to the left. The operating lever 23 will now be constantly locked, so that no liquid can be tapped off.

Locking of the operating lever 34 is invariably effected when there is no coin between the wall portions 301 and 403. When in fact, the valve slide 205 is not at the position shown in the figure but is more to the left, the spring 130, carrying with it the pull rod 414 and the releasing lever 415, can shift the cam 418 far enough to the left to allow the locking face 409 to move upward to such an extent that the end 400 necessarily strikes against it.

If the valve slide 205 is actually in the position shown in the figure, but the coin has not yet dropped between 301 and 403, it will mean that when the operating lever is pressed down slightly the pull rod 414 will be able, on account of the presence of the oblong hole 425, to move to the left to such an extent as to enable the spring to move the locking arm 411 upward sufficiently, so that from then onwards the operating lever is locked. Therefore, only when the valve slide 205 has moved sufficiently to the right will the cam 417 push the coin lever far enough to the right to enable the coin to drop between 301 and 403. Not until the coin is between 301 and 403 is the locking released, whereupon the operating lever can be pressed down and the mixture drawn off.

It is clear that the notches 216 and 419 will fix the valve slide firmly at its two extreme positions by means of the conical wedge-shaped end of the resilient pin 214, so that some force is required in order to move the valve slide out of one of its extreme positions. The force of the spring 421 is not sufficient for this and as the spring 130 is weaker than the spring 421 the spring 130 is also unable to move the valve slide out of its extreme position.

FIGURE 12 shows the initial position of the coin-in-slot device of FIGURE 6 and the locking device of FIGURE 11 when no coin has yet been inserted. This means that when the draw-off handle 24 is pulled down this handle is locked by part 409.

FIGURE 13 shows the position of the device of FIGURE 14 just after a coin is inserted. The coin 307 is in the position 307A, lying on part 302 the governor piston valve 205 is still in its left hand position and the oil mechanism has not yet acted, so that no oil and no petrol or hardly any petrol has flown into the container 1.

FIGURE 14 shows the same device as FIGURE 13, but now the oil mechanism has acted. The governor piston valve 205 moved to the right and some petrol has already flown into the container 1, but the container is not yet full of mixture. The pressure switch 72 has not yet acted and the coin is still in its position 307A of FIGURE 13.

FIGURE 15 shows what happens when the device is in the phase of FIGURE 14; now the draw-off handle 24 is pressed down, that is to say is pressed down too early. By pressing down the handle 24 the pull rod 414 will move slightly to the left owing to the oblong hole 425, cam 417 will free pin 418 and spring 130 will block handle 24 by raising 409. The coin remains in its position 307A of FIGURE 13.

FIGURE 16 shows the same device of FIGURE 13 but now the container 1 is full, although the oil mechanism has not acted properly. If now the draw-off handle 24 is pulled down it will be locked. Pressure switch 72 has acted, but the coin cannot drop between parts 301 and 403, but will fall on to 405, position 307B, because 417 has freed 418 and spring 130 has pulled 404 with part 405 to the left. Consequently the petrol cannot be drawn off.

FIGURE 17 shows the same device as FIGURES 13 and 14 when all mechanisms have acted properly. The coin has dropped into its last position 307C and has blocked lever 404. When the handle 24 is now pulled down to draw off the mixture, part 400 moves over 410, pulls down part 411, and opens 403. The coin is fed from position 307C between 403 and 301 and will drop into the coin collector 413, FIGURE 6.

What I claim is:

1. Apparatus for obtaining an apportioned amount of a mixture of a main liquid with at least one subsidiary liquid in proportions selectable at will comprising a self-mixing dosage container, an internal container inside said dosage container, said internal container communicating by means of apertures of small diameter with the remaining space of said dosage container; a feed system for said main liquid, comprising a main liquid retainer, a pump, a feed line opening into said internal container, and a retaining valve in said feed line, said pump forcing said main liquid into said internal container; separate feed systems for said subsidiary liquids, each system comprising a feed line opening into said internal container, a pump forcing said subsidiary liquid into said internal container, and an adjustable metering device in said feed system; dispensing means associated with said internal container, including a discharge line and a discharge valve in said line; manually actuated means for actuating said discharge valve; and a self-acting switch associated with said dosage container becoming operative when said dosage container is entirely filled; said apertures ensuring intimate mixture of the liquids during the filling operation of the dosage container.

2. Apparatus according to claim 1, characterized in that the dosage container is provided with a displacer by means of which the capacity can be altered.

3. Apparatus according to claim 1, characterized in that the dosage container is provided with an air admission valve which is operated by the discharge valve actuating means.

4. Apparatus according to claim 1 wherein said dosage container is closed by a top cover and by a bottom cover and wherein said internal container is a vertical tube tightly joined to said covers.

5. An apparatus as claimed in claim 4, wherein said dosage container and said top cover are mounted for slidable displacement with respect to each other and where said bottom cover carries said container for vertical movement with respect to said top cover, comprising sealing means for sealing said container against said top cover and means for preventing rotational displacement of said container and top cover during said vertical movement.

6. An apparatus as claimed in claim 4, wherein said internal container comprises two parts screwed together by engaging threads, one part being non-rotatably secured to said bottom cover, the other part being rotatably secured to said top cover, rotation of said upper part causing vertical displacement of said lower part and thereby vertical displacement of said dosage container with respect to said top cover.

7. An apparatus as claimed in claim 6, wherein said manually actuated means comprises an operating rod passing concentrically through said internal container, said operating rod comprising an upper and a lower part engaged for vertical displacement with respect to each other by means of threads having the same pitch as the threads engaging the two parts of said internal container, means preventing rotation of said lower part of the rod, the upper part of the rod being secured in the upper part of said internal container for rotation therewith, said arrangement ensuring the operating rod to have inside the container a length corresponding to the distance of said top and bottom covers.

8. An apparatus as claimed in claim 1 wherein said adjustable metering device comprises a closed cylinder, ports at said cylinder for the entry and discharge of said subsidiary liquid, a piston movable in said cylinder and actuated by said subsidiary liquid, a governor slide valve movable by said subsidiary liquid from a starting to an end position, thereby controlling the feed of said subsidiary liquid alternating to said ports for to-and-fro movement of said piston, a single to-and-fro movement of said piston supplying a predetermined quantity of subsidiary liquid to said dosage container, means adjusting the stroke of said piston, said discharge valve actuating means being operatively connected with said slide valve and returning the same to the starting position on actuation of said discharge valve, and coin-operated means including a coin-slot blocking and releasing said discharge valve actuating means.

9. An apparatus as claimed in claim 8 wherein said stroke adjusting means comprise a fixed stop and a movable stop in said cylinder and means adjustable controlling the position of said movable stop.

10. An apparatus as claimed in claim 8 wherein said governor slide valve comprises a housing, a valve piston movable in said housing, a line connecting the valve to the pump for the subsidiary liquid, lines connecting the valve to the feed line to the dosage container, lines connecting the valve to said cylinder ports, said piston valve on its movement from the starting to the end position successively connecting said pump line to said ports and connecting simultaneously the port not just connected with said pump line to one of said feed line connections, thereby permitting discharge of the subsidiary liquid successively from either end of said cylinder into said feed line.

11. An apparatus as claimed in claim 10 comprising a first recess in said valve piston of said governor slide valve forming a passage for subsidiary liquid forced by the pump into the closed cylinder of the metering device, a much smaller second recess, a locking pin removably engaging said second recess, spring means forcing said locking pin resiliently into said second recess when the valve piston is in its starting position, a first and a second channel passing transversely through said valve piston at either side of said first recess, and a plurality of apertures in the housing of said governor slide valve, said apertures, counted from the starting to the end position of the valve piston, comprising:

a first aperture connected to said pump to admit subsidiary liquid behind the valve piston at its starting position;

a seventh aperture connecting the space behind the end position of the valve piston to a connection to the feed line to the dosage container;

a third aperture connecting said recess at all positions of the valve piston to said pump;

a second aperture connected on the one hand by means of a passage to the space behind the starting position of said piston of said metering device and on the other hand in communication with the recess of the valve piston when said valve piston is in its starting position;

a sixth aperture connecting to said free line;

a fifth aperture also connected to said feed line and in communication with said first channel when the valve is in its end position, which channel at that position communicates with said second aperture;

a fourth aperture communicating with said recess when the piston valve is in its end position;

and manipulating means for returning the piston valve into its starting position.

12. An apparatus as claimed in claim 8 wherein said discharge valve actuating means in a first lever opening said valve when in pressed-down position, said apparatus including a second lever fitted to said first lever, a pull rod, means operatively connecting said pull rod with said second lever, a pivotally mounted releasing lever operated by said pull rod and actuating said slide valve, a spring attached to said pull rod and holding said releasing lever in the starting position of said valve, said second lever operatively connecting said first lever with said pull rod, said lever system being made operable on insertion of a coin into said coin slot.

13. An apparatus as claimed in claim 12 wherein the means connecting the pull rod and second lever comprises a bell crank, one arm of said bell crank actuating said pull rod and having a cam surface for locking engagement with the end of said second lever, the other arm of said bell crank forming said coin slot with a stationary wall of the apparatus, and means releasing said locking engagement on insertion of a coin into the coin slot.

References Cited by the Examiner

UNITED STATES PATENTS

| | | | |
|---|---|---|---|
| 1,258,964 | 3/18 | Voorsanger | 222—132 |
| 2,712,887 | 7/55 | King | 222—132 |
| 2,760,618 | 8/56 | Eason | 194—13 |
| 2,788,953 | 4/57 | Schneider | 222—134 X |
| 2,938,976 | 5/60 | Wilson | 200—82 |
| 2,982,829 | 5/61 | McCabe | 200—82 |

FOREIGN PATENTS 938,041  2/56  Germany.

RAPHAEL M. LUPO, *Primary Examiner.*

LAVERNE D. GEIGER, LOUIS J. DEMBO, *Examiners.*